(12) United States Patent
Harripersaud

(10) Patent No.: US 10,876,680 B2
(45) Date of Patent: Dec. 29, 2020

(54) SWIVELABLE CORNER STAND

(71) Applicant: Richie Harripersaud, Orlando, FL (US)

(72) Inventor: Richie Harripersaud, Orlando, FL (US)

( * ) Notice: Subject to any disclaimer, the term of this patent is extended or adjusted under 35 U.S.C. 154(b) by 62 days.

(21) Appl. No.: 16/296,699

(22) Filed: Mar. 8, 2019

(65) Prior Publication Data

US 2020/0284393 A1 Sep. 10, 2020

(51) Int. Cl.
*F16M 11/00* (2006.01)
*F16M 11/20* (2006.01)
*F16M 11/28* (2006.01)
*A47B 81/06* (2006.01)

(52) U.S. Cl.
CPC ....... *F16M 11/2014* (2013.01); *A47B 81/064* (2013.01); *A47B 81/065* (2013.01); *F16M 11/28* (2013.01)

(58) Field of Classification Search
CPC ............................ F16M 11/2014; F16M 11/08
USPC ......... 248/125.7, 186.1, 186.2, 125.8, 125.9, 248/131
See application file for complete search history.

(56) References Cited

U.S. PATENT DOCUMENTS

| | | | |
|---|---|---|---|
| 5,207,405 A | 5/1993 | Cobb | |
| 5,540,159 A | 7/1996 | Anderson | |
| 6,061,104 A | 5/2000 | Evanicky | |
| D441,224 S | 5/2001 | Scheper | |
| D652,045 S | 1/2012 | Hong | |
| 9,557,002 B2 | 1/2017 | Wong | |
| 9,949,554 B2* | 4/2018 | Sullivan | A47F 5/08 |
| 2005/0077440 A1* | 4/2005 | Kochanski | F16M 11/046 248/125.7 |
| 2006/0086867 A1* | 4/2006 | Wang | A47G 33/06 248/125.8 |
| 2006/0156963 A1* | 7/2006 | Fischer | A47B 13/023 108/69 |
| 2006/0255215 A1* | 11/2006 | Carnevali | F16B 7/14 248/125.8 |
| 2008/0042020 A1* | 2/2008 | Laitila | F16M 11/041 248/131 |
| 2011/0079685 A1 | 4/2011 | Kwak | |
| 2013/0269150 A1* | 10/2013 | Hartley | F16L 3/217 15/347 |

* cited by examiner

*Primary Examiner* — Steven M Marsh

(57) ABSTRACT

A swivelable corner stand for supporting a TV or other devices in a corner of a room includes a base having a left side and a right side each comprising a front facet extending perpendicular to a front side and a back facet extending 45° from the front side and 45° from a back side. A support post is coupled to the base and has a perpendicular portion extending up from the base and a parallel portion extending from the perpendicular portion parallel to the base. A swivel is coupled to the parallel portion and a platform is coupled to the swivel. The platform has a left face and a right face each comprising a front portion extending perpendicular to a front face and a back portion extending 45° from the front face and 45° from a back face.

10 Claims, 5 Drawing Sheets

SWIVELABLE CORNER STAND

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to stands and more particularly pertains to a new stand for supporting a TV or other devices in a corner of a room.

BRIEF SUMMARY OF THE INVENTION

An embodiment of the disclosure meets the needs presented above by generally comprising a base having a top side separated from a bottom side, a front side separated from a back side, and a left side separated from a right side. The left side and the right side each comprise a front facet extending perpendicular to the front side and a back facet extending 45° from the front side and 45° from the back side. A support post is coupled to the base and has a perpendicular portion extending up from the top side of the base and a parallel portion extending from the perpendicular portion parallel to the base. A swivel is coupled to the parallel portion and a platform is coupled to the swivel. The platform has a top surface separated from a bottom surface, a front face separated from a back face, and a left face separated from a right face. The left face and the right face each comprise a front portion extending perpendicular to the front face and a back portion extending 45° from the front face and 45° from the back face.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
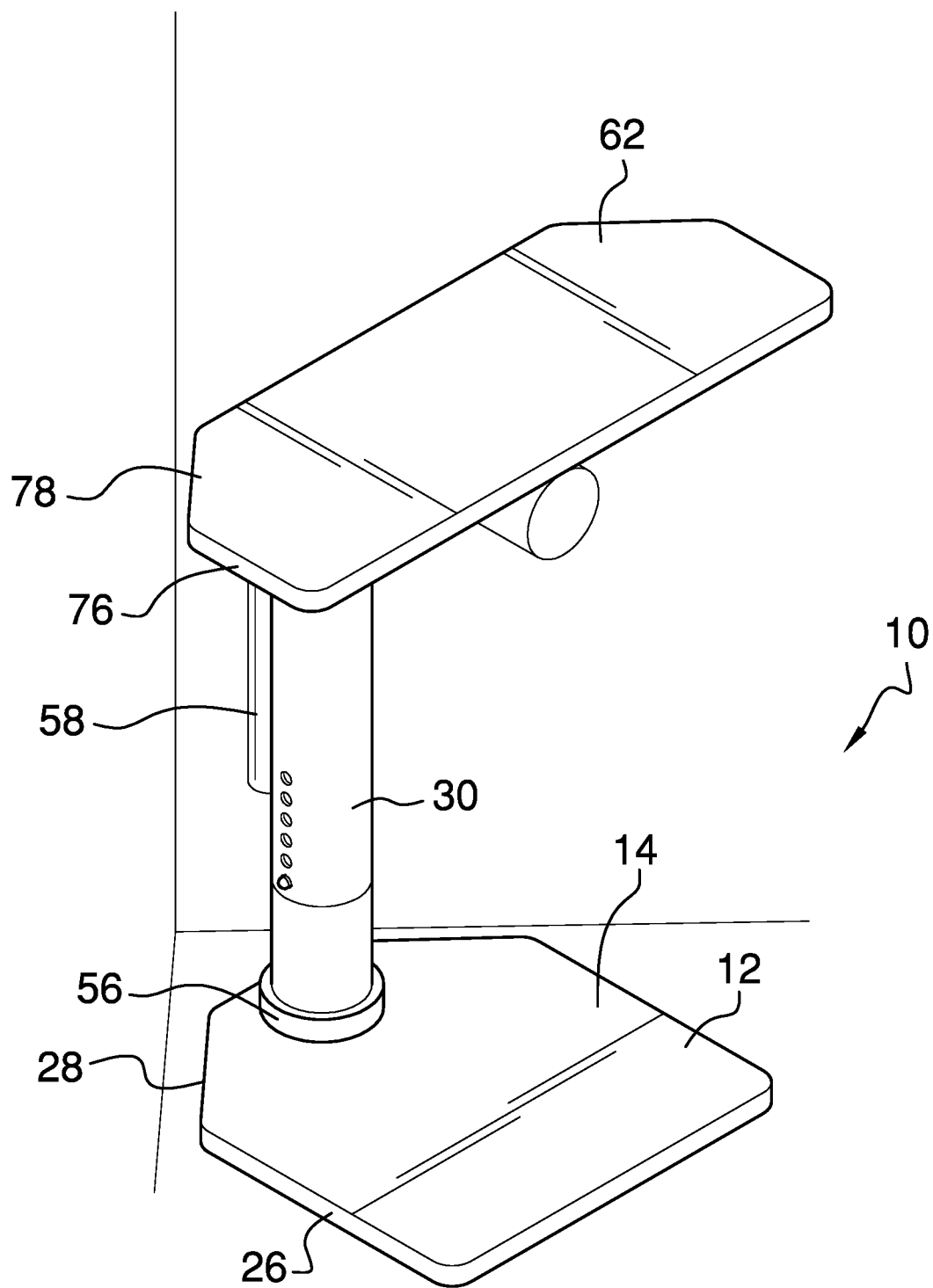
FIG. 1 is an isometric view of a swivelable corner stand according to an embodiment of the disclosure.
Figure 2:
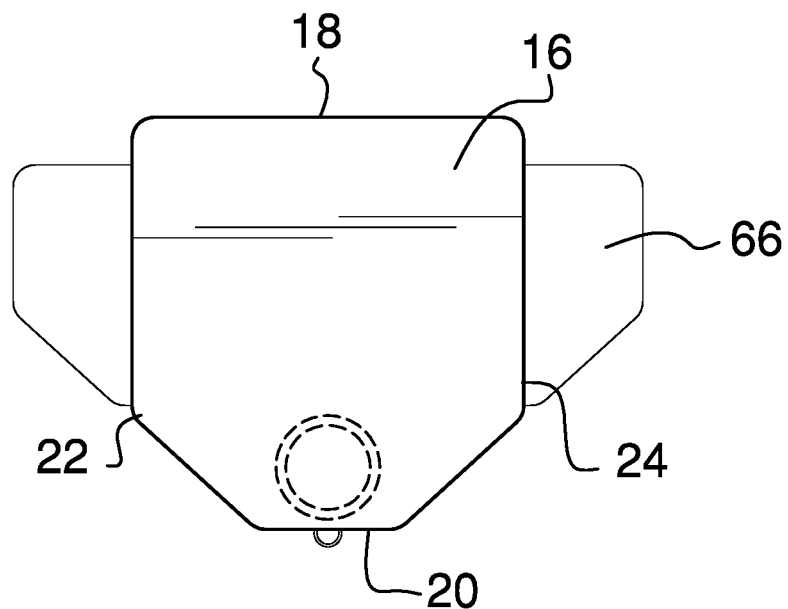
FIG. 2 is a bottom plan view of an embodiment of the disclosure.
Figure 3:
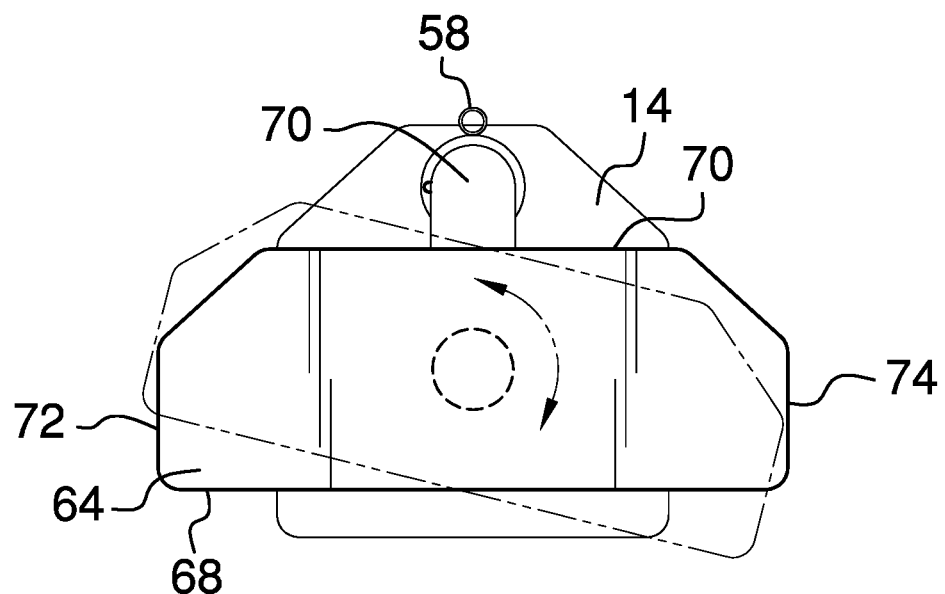
FIG. 3 is a top plan view of an embodiment of the disclosure.
Figure 4:
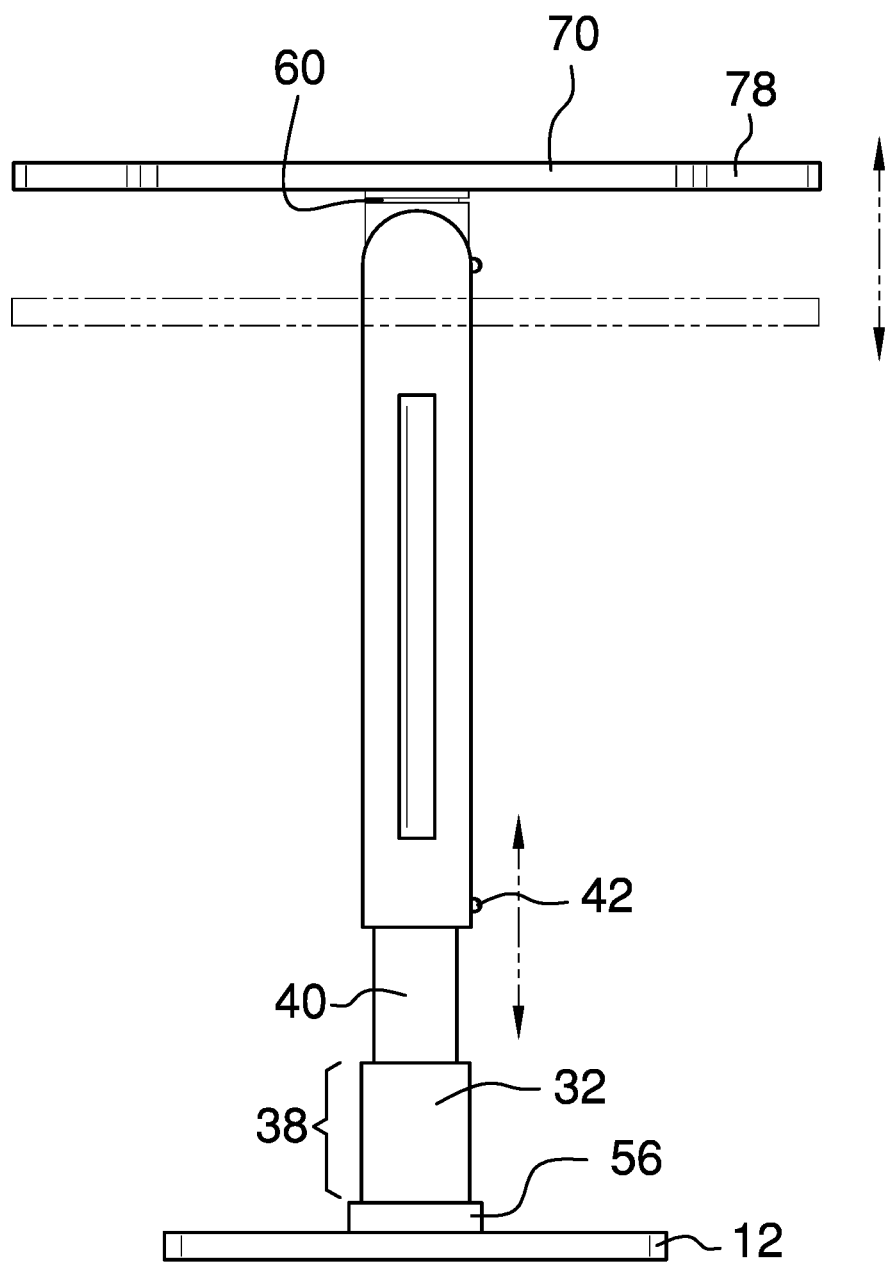
FIG. 4 is a rear elevation view of an embodiment of the disclosure.
Figure 5:
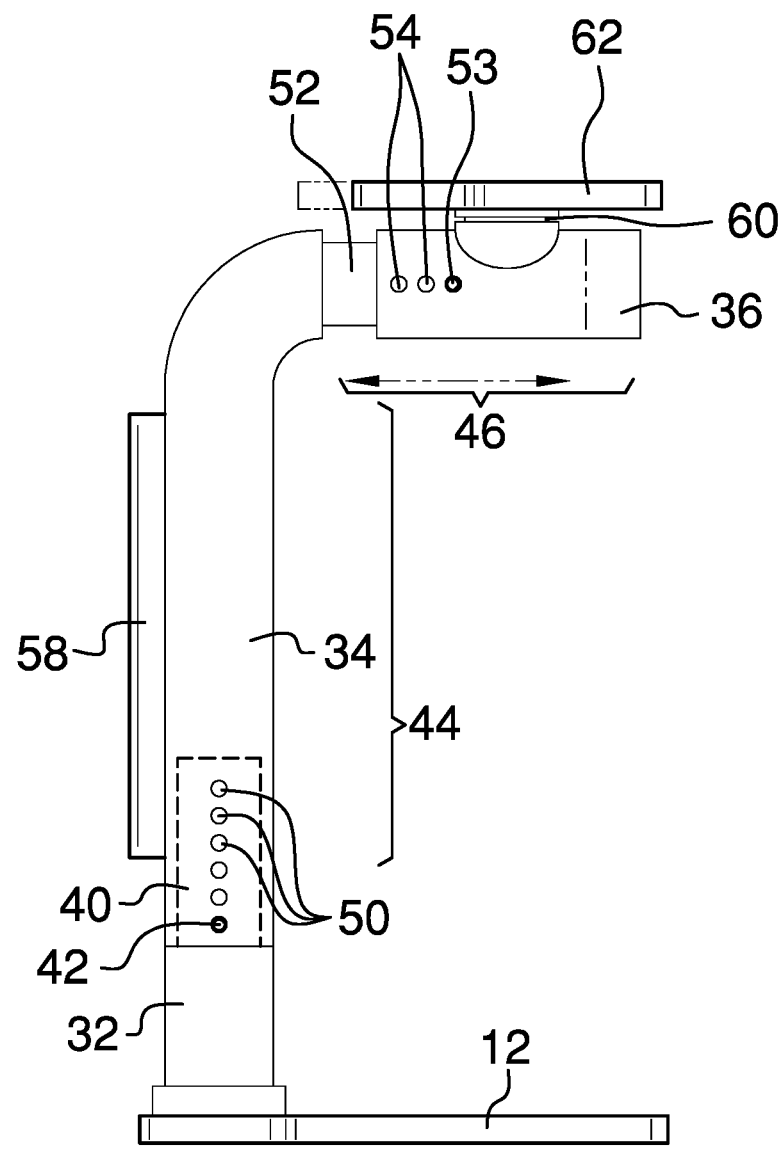
FIG. 5 is a side elevation view of an embodiment of the disclosure.
Figure 6:
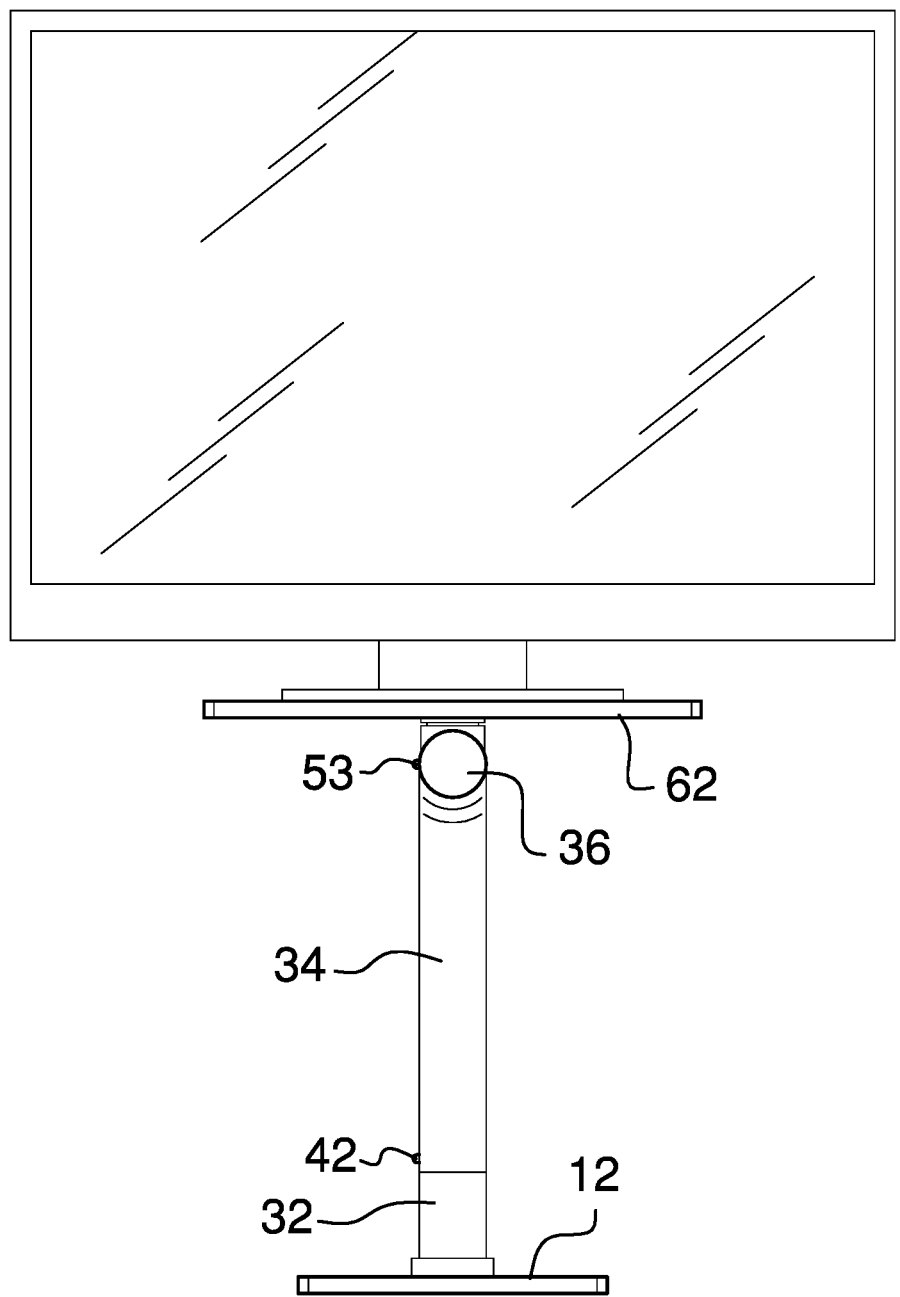
FIG. 6 is an in-use view of an embodiment of the disclosure.

With reference now to the drawings, and in particular to FIGS. 1 through 6 thereof, a new stand embodying the principles and concepts of an embodiment of the disclosure and generally designated by the reference numeral 10 will be described.

As best illustrated in FIGS. 1 through 6, the swivelable corner stand 10 generally comprises a base 12 having a top side 14 separated from a bottom side 16, a front side 18 separated from a back side 20, and a left side 22 separated from a right side 24. The left side 22 and the right side 24 each comprise a front facet 26 extending perpendicular to the front side 18 and a back facet 28 extending 45° from the front side 18 and 45° from the back side 20 in order to allow the base to fit deep into a corner of a room. The base 12 has rounded corners.

A support post 30 is coupled to the base 12. The support post 30 may be tubular and comprises a lower support 32 coupled to the base 12, a main support 34 attached to the lower support 32, and an upper support 36 attached to the main support 34. The lower support 32 has a base portion 38 and a first adjustment extension 40 attached to the base portion 38. The first adjustment extension 40 has a first spring-loaded button 42. The main support 34 is a 90° elbow to comprise a perpendicular portion 44 extending up from the top side 14 of the base and a parallel portion 46 extending from the perpendicular portion 44 parallel to the base 12. A bottom end 48 of the perpendicular portion slidingly receives the first adjustment extension 40 of the lower support. The perpendicular portion 44 has a plurality of first adjustment apertures 50 to selectively receive the first spring-loaded button 42. The parallel portion 46 has a second adjustment extension 52 having a second spring-loaded button 53. The upper support 36 slidingly receives the second adjustment extension 52 of the main support and has a plurality of second adjustment apertures 54 to selectively receive the second spring-loaded button 54. Each of the first adjustment extension 40 and the second adjustment extension 52 have a diameter substantially conforming to an inner diameter of the main support 34 and the upper support 36.

A flange 56 is coupled to the lower support 32 and the base 12 to reinforce the support post 30. A wire channel 58 is coupled to the perpendicular portion 44 of the main support and is configured to receive a plurality of wires from electronics. A swivel 60 is coupled to upper support 36 and a platform 62 is coupled to the swivel 60. The swivel 60 allows the platform 62 to rotate up to 360°. The platform 62 has a top surface 64 separated from a bottom surface 66, a front face 68 separated from a back face 70, and a left face 72 separated from a right face 74. The left face 72 and the right face 74 each comprising a front portion 76 extending perpendicular to the front face 68 and a back portion 78 extending 45° from the front face 68 and 45° from the back face 70 to fit into the corner of the room as the base 12 does. The platform 62 may have rounded corners to prevent injury and damage to the walls. The height of the platform may fall between 48" and 60" and the front face of the platform has a width of at least 48".

In use, the apparatus 10 is placed into the corner of the room and the support post 30 is adjusted using the first 42 and second 54 spring-loaded buttons to find an optimal height and distance from the corner. A TV is then placed on the platform 62 with the wires running through the wire channel 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swivelable corner stand apparatus comprising:
    a base, the base having a top side separated from a bottom side, a front side separated from a back side, and a left side separated from a right side, the left side and the right side each comprising a front facet extending perpendicular to the front side and a back facet extending 45° from the front side and 45° from the back side;
    a support post coupled to the base, the support post having a perpendicular portion extending up from the top side of the base and a parallel portion extending from the perpendicular portion parallel to the base;
    a swivel coupled to the support post, the swivel being coupled to the parallel portion;
    a platform coupled to the swivel, the platform having a top surface separated from a bottom surface, a front face separated from a back face, and a left face separated from a right face, the left face and the right face each comprising a front portion extending perpendicular to the front face and a back portion extending 45° from the front face and 45° from the back face; and
    the support post comprising
        a lower support coupled to the base, the lower support having a base portion and a first adjustment extension attached to the base portion, the first adjustment extension having a first spring-loaded button,
        a main support attached to the lower support, the main support being a 90° elbow to comprise the perpendicular portion and the parallel portion, a bottom end of the perpendicular portion slidingly receiving the first adjustment extension of the lower support, the perpendicular portion having a plurality of first adjustment apertures to selectively receive the first spring-loaded button, the parallel portion having a second adjustment extension having a second spring-loaded button, and
        an upper support attached to the main support, the upper support slidingly receiving the second adjustment extension of the main support and having a plurality of second adjustment apertures to selectively receive the second spring-loaded button.

2. The swivelable corner stand apparatus of claim 1 further comprising the support post being tubular.

3. The swivelable corner stand apparatus of claim 1 further comprising each of the first adjustment extension and the second adjustment extension having a diameter substantially conforming to an inner diameter of the main support and the upper support.

4. The swivelable corner stand apparatus of claim 1 further comprising a flange coupled to the support post and the base to reinforce the support post.

5. The swivelable corner stand apparatus of claim 1 further comprising a wire channel coupled to the support post, the wire channel being configured to receive a plurality of wires from electronics placed on the platform.

6. The swivelable corner stand apparatus of claim 1 further comprising a wire channel coupled to the perpendicular portion of the main support, the wire channel being configured to receive a plurality of wires from electronics placed on the platform.

7. The swivelable corner stand apparatus of claim 1 further comprising the front face of the platform having a width of at least 48".

8. The swivelable corner stand apparatus of claim 1 further comprising the platform being from 48" to 60" above the base.

9. The swivelable corner stand apparatus of claim 1 further comprising each of the base and the platform having rounded corners.

10. A swivelable corner stand apparatus comprising:
    a base, the base having a top side separated from a bottom side, a front side separated from a back side, and a left side separated from a right side, the left side and the right side each comprising a front facet extending perpendicular to the front side and a back facet extending 45° from the front side and 45° from the back side, the base having rounded corners;
    a support post coupled to the base, the support post being tubular and comprising:
        a lower support coupled to the base, the lower support having a base portion and a first adjustment extension attached to the base portion, the first adjustment extension having a first spring-loaded button;

a main support attached to the lower support, the main support being a 90° elbow to comprise a perpendicular portion extending up from the top side of the base and a parallel portion extending from the perpendicular portion parallel to the base, a bottom end of the perpendicular portion slidingly receiving the first adjustment extension of the lower support, the perpendicular portion having a plurality of first adjustment apertures to selectively receive the first spring-loaded button, the parallel portion having a second adjustment extension having a second spring-loaded button; and an upper support attached to the main support, the upper support slidingly receiving the second adjustment extension of the main support and having a plurality of second adjustment apertures to selectively receive the second spring-loaded button;

wherein each of the first adjustment extension and the second adjustment extension having a diameter substantially conforming to an inner diameter of the main support and the upper support;

a flange coupled to the support post, the flange being coupled to the lower support and the base to reinforce the support post;

a wire channel coupled to the support post, the wire channel being coupled to the perpendicular portion of the main support, the wire channel being configured to receive a plurality of wires;

a swivel coupled to the support post, the swivel being coupled to the upper support; and a platform coupled to the swivel, the platform having a top surface separated from a bottom surface, a front face separated from a back face, and a left face separated from a right face, the left face and the right face each comprising a front portion extending perpendicular to the front face and a back portion extending 45° from the front face and 45° from the back face, the platform having rounded corners.

* * * * *